United States Patent
Ohtake

(10) Patent No.: US 9,442,784 B2
(45) Date of Patent: Sep. 13, 2016

(54) MANAGEMENT DEVICE, MANAGEMENT METHOD, AND MEDIUM STORING MANAGEMENT PROGRAM

(71) Applicant: NEC Corporation, Minato-ku, Tokyo (JP)

(72) Inventor: Takamasa Ohtake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 14/156,597

(22) Filed: Jan. 16, 2014

(65) Prior Publication Data

US 2014/0201577 A1    Jul. 17, 2014

(30) Foreign Application Priority Data

Jan. 16, 2013 (JP) ................. 2013-005450

(51) Int. Cl.
| | | |
|---|---|---|
| *G06F 11/00* | (2006.01) | |
| *G06F 11/07* | (2006.01) | |
| *G06F 11/20* | (2006.01) | |

(52) U.S. Cl.
CPC ....... *G06F 11/0709* (2013.01); *G06F 11/2025* (2013.01); *G06F 11/2028* (2013.01); *G06F 11/2041* (2013.01); *G06F 11/2048* (2013.01)

(58) Field of Classification Search
CPC ........... G06F 11/0709; G06F 11/2038; G06F 11/2028; G06F 11/2097; G06F 11/2035; G06F 11/2025

USPC ....................................................... 714/13, 48
See application file for complete search history.

(56) References Cited

U.S. PATENT DOCUMENTS

| | | | | |
|---|---|---|---|---|
| 2004/0267486 | A1* | 12/2004 | Percer et al. ................. | 702/120 |
| 2005/0262381 | A1* | 11/2005 | Ishida ................. | G06F 11/2025 714/6.13 |
| 2008/0215771 | A1* | 9/2008 | Osaki ................. | G06F 11/2097 710/46 |
| 2011/0066319 | A1* | 3/2011 | Bechtler ................. | B60T 8/885 701/29.2 |
| 2012/0023367 | A1* | 1/2012 | Rudy et al. ..................... | 714/16 |

FOREIGN PATENT DOCUMENTS

| | | |
|---|---|---|
| JP | 2010-67042 A | 3/2010 |
| JP | 2012-185560 A | 9/2012 |

* cited by examiner

*Primary Examiner* — Yair Leibovch

(57) ABSTRACT

A management device includes a node information storing unit which stores, for each of plural operation devices, an device state representing whether the operation device is in a working state or in a non-working state, the device state associated with an identifier of the operation device, a fault state acquiring unit which acquires a value representing whether or not a fault exists from each of the operation devices that are in the non-working state, and an instruction unit which sends, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state.

8 Claims, 13 Drawing Sheets

Fig. 6

| IDENTIFIER | NODE ADDRESS | NODE STATE | BMC ADDRESS | BMC STATE |
| --- | --- | --- | --- | --- |
| NODE 1 | ADDRESS 1 | WORKING | BMC ADDRESS | NOT MONITORED |
| ... | | | | |
| NODE i | ADDRESS i | WORKING | BMC ADDRESS i | NOT MONITORED |
| NODE i+1 | ADDRESS i+1 | WORKING | BMC ADDRESS i+1 | NOT MONITORED |
| ... | | | | |
| NODE j | ADDRESS j | WORKING | BMC ADDRESS j | NOT MONITORED |
| NODE j+1 | ADDRESS j+1 | NON-WORKING | BMC ADDRESS j+1 | NORMAL |
| ... | | | | |
| NODE k | ADDRESS k | NON-WORKING | BMC ADDRESS k | NORMAL |

MANAGEMENT DEVICE, MANAGEMENT METHOD, AND MEDIUM STORING MANAGEMENT PROGRAM

This application is based upon and claims the benefit of priority from Japanese Patent Application No. 2013-005450, filed on Jan. 16, 2013, the disclosure of which is incorporated herein in its entirety by reference.

TECHNICAL FIELD

The present invention relates to a management device, a management method and a medium storing a management program, and in particular relates to a management device, a management method and a medium storing a management program for a plurality of operation devices.

BACKGROUND ART

An example of an information processing system, such as a cloud system, including a plurality of operation devices, which starts a standby operation device working when a fault occurs in a working operation device, is disclosed by the patent document 1 and the patent document 2.

A computer system described in the patent document 1 includes a first computer which processes transactions, a standby computer, a second computer and a third computer. The second computer includes a management unit which manages the first computer and the standby computer. The third computer manages starting and stopping of the standby computer. When a fault occurs in the first computer, the second computer controls the standby computer taking over the transactions from the first computer. The third computer determines whether a fault occurs in the second computer. When a fault occurs in the second computer, on the basis of acquired configuration information, the third computer controls the standby computer taking over the management unit from the second computer.

A cluster system described in the patent document 2 includes three or more nodes. Each node includes a cluster management unit which determines which the node is among a first node, a second node, and a third node. The first node executes an application. When a fault occurs in the first node, the second node executes the application. The third node is a node other than the first node and the second node. The second node synchronizes application information with that of the first node by a fully-synchronizing method. The cluster management units of the second node and the third node detect a fault occurs in the first node, respectively. When a fault occurs in the first node is detected, the second node works as the first node. Moreover, when the occurrence of the fault is detected in the first node, the cluster management unit of one of the third nodes determines changing to the second node. The third node whose cluster management unit determines changing to the second node works as the second node.

[Patent document 1] Japanese Patent Application Laid-Open No. 2010-067042

[Patent document 2] Japanese Patent Application Laid-Open No. 2012-185560

SUMMARY

One of the objects of the present invention is to provide a management device which changes the operation device that carries out a process from the failed working operation device to one of standby operation devices, even when a standby operation device among the standby operation devices may fail.

[Exemplary Aspect of the Invention]

A management device includes a node information storing unit which stores, for each of plural operation devices, an device state representing whether the operation device is in a working state in which the operation device is working or in a non-working state in which the operation device is not working, the device state associated with an identifier of the operation device, a fault state acquiring unit which acquires a value representing whether or not a fault exists from each of the operation devices that are in the non-working state, and an instruction unit which sends, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state.

A management method includes storing, in a node information storing unit, for each of plural operation devices, an device state representing whether the operation device is in a working state in which the operation device is working or in a non-working state in which the operation device is not working, the device state associated with an identifier of the operation device, acquiring a value representing whether or not a fault exists from each of the operation devices that are in the non-working state, and sending, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state.

A non-transitory computer-readable medium storing a management program which makes a computer work as a node information storing unit which stores, for each of plural operation devices, an device state representing whether the operation device is in a working state in which the operation device is working or in a non-working state in which the operation device is not working, the device state associated with an identifier of the operation device, a fault state acquiring unit which acquires a value representing whether or not a fault exists from each of the operation devices that are in the non-working state, and an instruction unit which sends, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state.

[Effect of the Invention]

The present invention has an effect that it is possible to change the operation device that carries out a process from the failed working operation device to one of standby operation devices, even when a standby operation among the standby operation devices may fail.

BRIEF DESCRIPTION OF THE DRAWINGS

Exemplary features and advantages of the present invention will become apparent from the following detailed description when taken with the accompanying drawings in which:

FIG. 6 is a diagram illustrating an example of a node list which a node information storing unit 10 stores;

EXEMPLARY EMBODIMENT

Next, an exemplary embodiment of the present invention will be described in detail with reference to a drawing.

Figure 1:
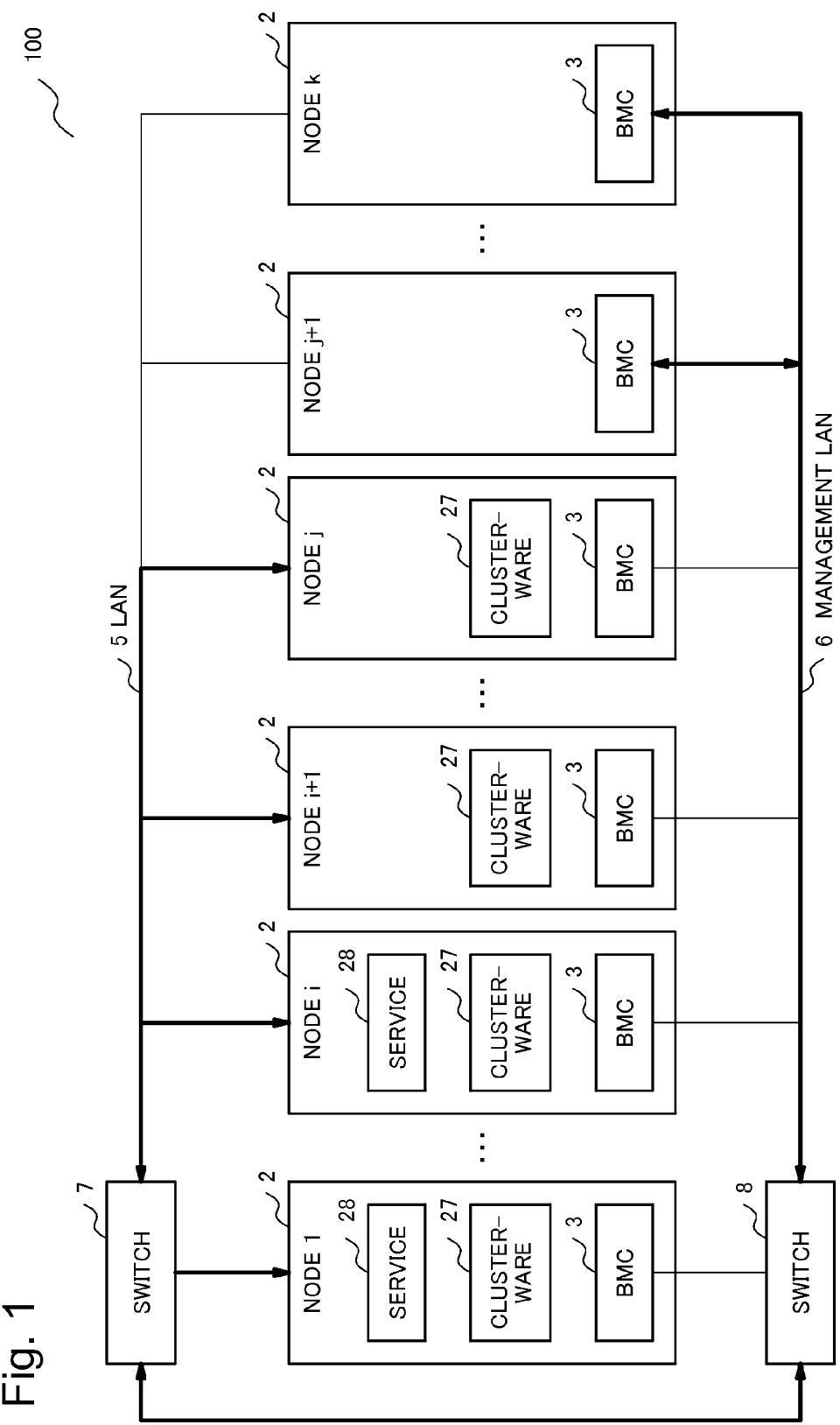
FIG. 1 is a block diagram illustrating an example of a configuration of an information processing system 100 according to a first exemplary embodiment.

FIG. 1 is a block diagram illustrating an example of a configuration of an information processing system 100 according to a first exemplary embodiment of the present invention.

The information processing system 100 shown in FIG. 1 includes a plurality of nodes 2 each of which is an operation device and which can communicate each other. According to the example shown in FIG. 1, the information processing system 100 is a cluster system including the nodes 2 whose number is k.

Figure 2:
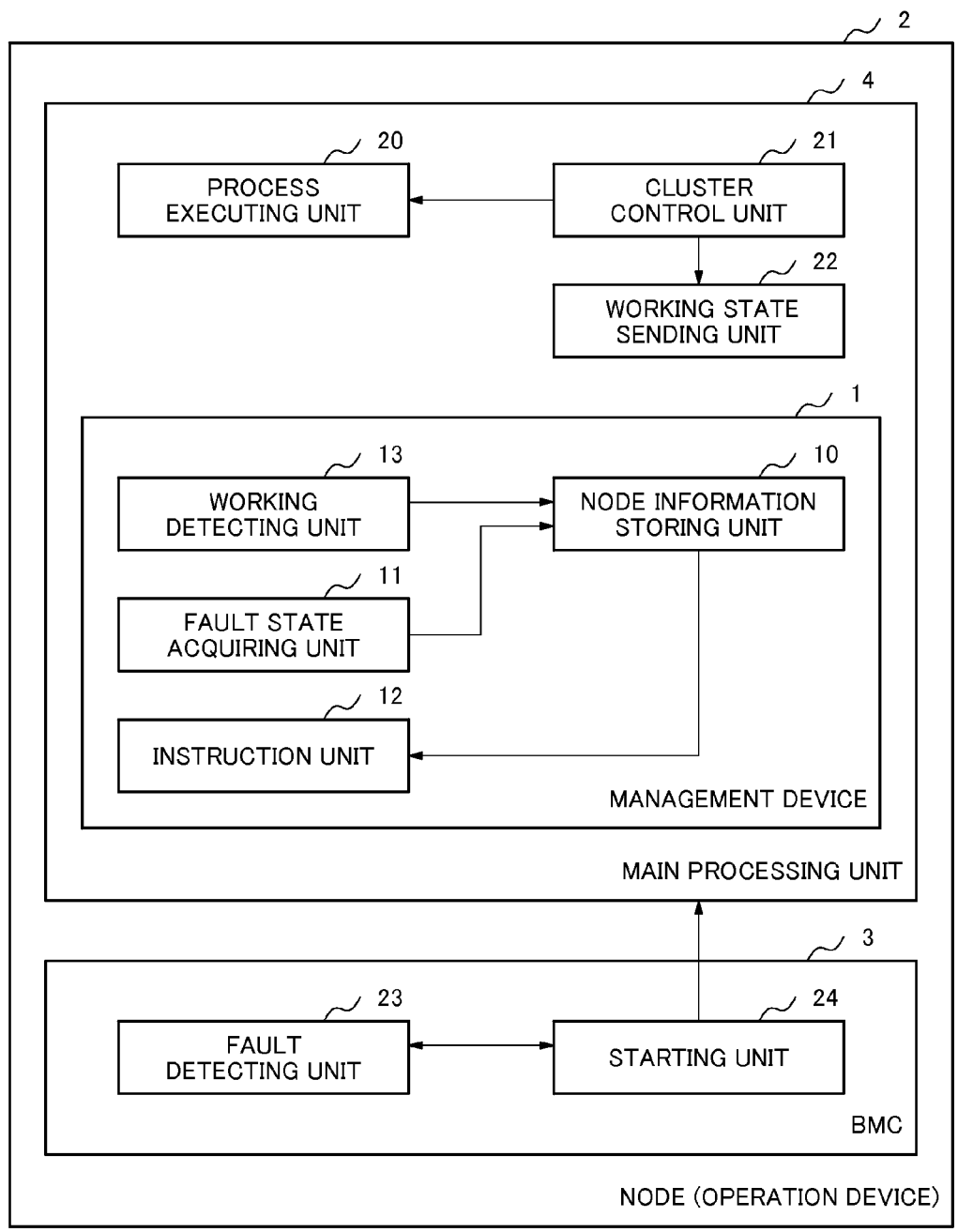
FIG. 2 is a block diagram illustrating an example of a configuration of a node 2.

FIG. 2 is a block diagram illustrating a configuration of the node 2.

Referring to FIG. 2, the node 2 includes a BMC 3 (Baseboard Management Controller) and a main processing unit 4. The main processing unit 4 is implemented, for example, using a processor of the node 2, OS (Operating System) which the processor executes, and a program which is executed on the OS. Meanwhile, the BMC 3 is a processing device which works independently of the main processing unit 4 and which is implemented on hardware of the node 2. The BMC 3 works even if the main processing unit 4 does not work, that is, the main processing unit 4 is, for example, in a power OFF state.

The BMC 3 includes a fault detecting unit 23 and a starting unit 24.

The main processing unit 4 includes a management device 1, a process executing unit 20, a cluster control unit 21 and a working state sending unit 22.

The management device 1 includes a node information storing unit 10, a fault state acquiring unit 11, an instruction unit 12 and a working detecting unit 13.

The nodes 2 can communicate each other through a first network which is a communication network. According to the example shown in FIG. 1, the first network includes LAN 5 (Local Area Network) including a switch 7. Moreover, the BMCs 3 of the nodes 2 can communicate each other through a second network which is a communication network. According to the example shown in FIG. 1, the second network includes a management LAN 6 including a switch 8. Moreover, the first network and the second network are connected each other. According to the example shown in FIG. 1, the first network and the second network are connected with each other through the switch 7 and the switch 8.

The process executing unit 20 provides a terminal, which can communicate with the information processing device 100, with a service by executing a program of providing the service. The terminal is not shown in the figure.

The cluster control unit 21 instructs the process executing unit 20 to start and to end providing the service.

A plurality of the nodes 2 are classified as an active node or a standby node. The active node executes, by use of the process executing unit 20 of the main processing unit 4, the program which is used for providing the service. The standby node is a node on standby, which does not execute the program which is used for providing the service. The standby node is classified as a hot standby node or a cold standby node. The hot standby node is a node which is in a working state, that is, in a state that the main processing unit 4 is working. The cold standby node is a node which is in a non-working state, that is, in a state that the main processing unit 4 is not working. In the following description, to be in the working state is described as to be working. Moreover, to be in the non-working state is described as to be not working. Each of the active node and the hot standby node is the node which is in the working state, that is, in the state that the main processing unit 4 is working.

The cluster control unit 21 of the node 2 in the working state detects a fault in the node 2 which includes the cluster control unit 21. In the case that a fault is detected in a node 2 whose process executing unit 20 provides the service, the cluster control unit 21 selects one of the nodes 2 which are in the working state and which are other than the node in which a fault is detected. Then, the cluster control unit 21 controls the selected node 2 so that the selected node 2 takes over the act of providing service from the node 2 in which the fault is detected, which provides the service. The cluster control unit 21 may observe whether each of the nodes 2 is alive or not to specify a node 2 in the working state. In the case that the node 2 includes the management device 1, the cluster control unit 21 may specify a node 2 in the working state from a list of the nodes 2 stored in the node information storing unit 10, which is described in detail later. Various existing method is applicable to the method of selecting one of the node 2 which are in the working state and which are other than the node in which a fault is detected. Various existing method is also applicable to the system changeover method in which the act of providing service by the node 2 is stopped, and the service is resumed by controlling one of the nodes 2 in the working state so as to take over the act of providing service.

The main processing unit 4 of the cold standby node does not work, which is in a state that, for example, power is off.

According to the example shown in FIG. 1, a node including clusterware 27 represents the node carrying out the clusterware 27. The clusterware 27 is a program which makes the main processing unit 4 work as the management device 1, the cluster control unit 21 and the working state sending unit 22. The node including the clusterware 27 is the working node. The node which further includes a service 28 is the node which executes a program for the processing executing unit 20 providing the service 28. The node which further includes the service 28 is the active node. A node not including the clusterware 27 and the service 28 is the cold standby node.

To the management device 1, the working state sending unit 22 sends a value representing that the node 2 which includes the working state sending unit 22 is in the working state. The working state sending unit 22 may send the value representing that the node 2 which includes the working state sending unit 22 is in the working state to the management device 1 of each of the nodes 2 which are in the working state. Moreover, to the management apparatus 1, the working state sending unit 22 may send a value, which may be a signal, data, information, or the like, representing a state of the process executing unit 20, that is, indicating whether the process executing unit 20 provides the service or not.

No matter whether the main processing unit 4 is working or not, the fault detecting unit 23 detects whether a fault occurs in the node 2 which includes the fault detecting unit 23. As will be described later, the fault state acquiring unit 11 periodically, for example, at a predetermined time interval, sends an inquiry about whether a fault exists or not, that is, an inquiry about existence of a fault, to the fault detecting unit 23. The fault detecting unit 23 receives the inquiry about whether the fault exists or not, which is issued by the fault state acquiring unit 11. Then, to the fault state acquiring unit 11, the fault detecting unit 23 sends a reply to the received inquiry about whether the fault exists or not. To the fault state acquiring unit 11, the fault detecting unit 23 may send, according to a result of detecting the fault, a value, which may be a signal, data, information, or the like, representing that a fault occurs or a value representing that a fault does not occur.

On the basis of an instruction issued by the instruction unit 12 of the management device 1, the starting unit 24 starts up, that is, activates the main processing unit 4 so that the main processing unit 4 starts to work, thereby the node 2, which includes the startup unit 24 and the main processing unit 4, makes a transition to the working state. Moreover, in the case that the node 2 is in the non-working state and the fault detecting unit 23 does not receive the inquiry about whether the fault exists or not from the management device 1 for a predetermined time interval which is not shorter than a predetermined time interval described later, the starting unit 24 starts up the main processing unit 4, thereby the node 2 makes the transition to the working state.

The working detecting unit 13 detects whether each of the nodes 2 is in the working state or not. From the working state sending unit 22 of each of the nodes 2 which are in the working state, the working detecting unit 13 may receive a value, which may be a signal, data, information, or the like, representing that the node 2 is in the working state. The working detecting unit 13 may estimate that the node 2 which does not send the data representing that the node 2 is in the working state is in the non-working state. The working detecting unit 13 may store identifier of the node 2 and data which represents that the node 2 is in the working state or that the node 2 is in the non-working state in the node information storing unit 10, the identifier of the node 2 and the data being associated with each other.

For each of the nodes 2, the node information storing unit 10 stores the identifier of the node 2 and a value, which represents that the node 2 is in the working state or represents that the node 2 is in the non-working state, the identifier of the node 2 and the value associated with each other.

The fault state acquiring unit 11 sends the inquiry about whether the fault exists or not to the fault detecting unit 23 in the BMC 3 of each of the nodes 2 which are in the non-working state. Then, from the fault detecting unit 23 which receives the inquiry about whether the fault or not, the fault state acquiring unit 11 acquires the data which represents whether or not the fault exists in the node 2 which includes the fault detecting unit 23. The fault state acquiring unit 11 sends the inquiry about whether the fault exists or not, for example, at a predetermined time interval.

In the case that number of the nodes 2 which are in the working state is smaller than a predetermined number (j according to the example shown in FIG. 1), the instruction unit 12 sends a work instruction, which is an instruction to start up the main processing unit 4 so as to make the transition to the working state, to the node 2 which has no fault and is in the non-working state. The instruction unit 12 may send the work instruction repeatedly to the node 2 which has no fault and is in the non-working state until the number of the nodes 2 which are in the working state reaches the predetermined number.

Figure 4:
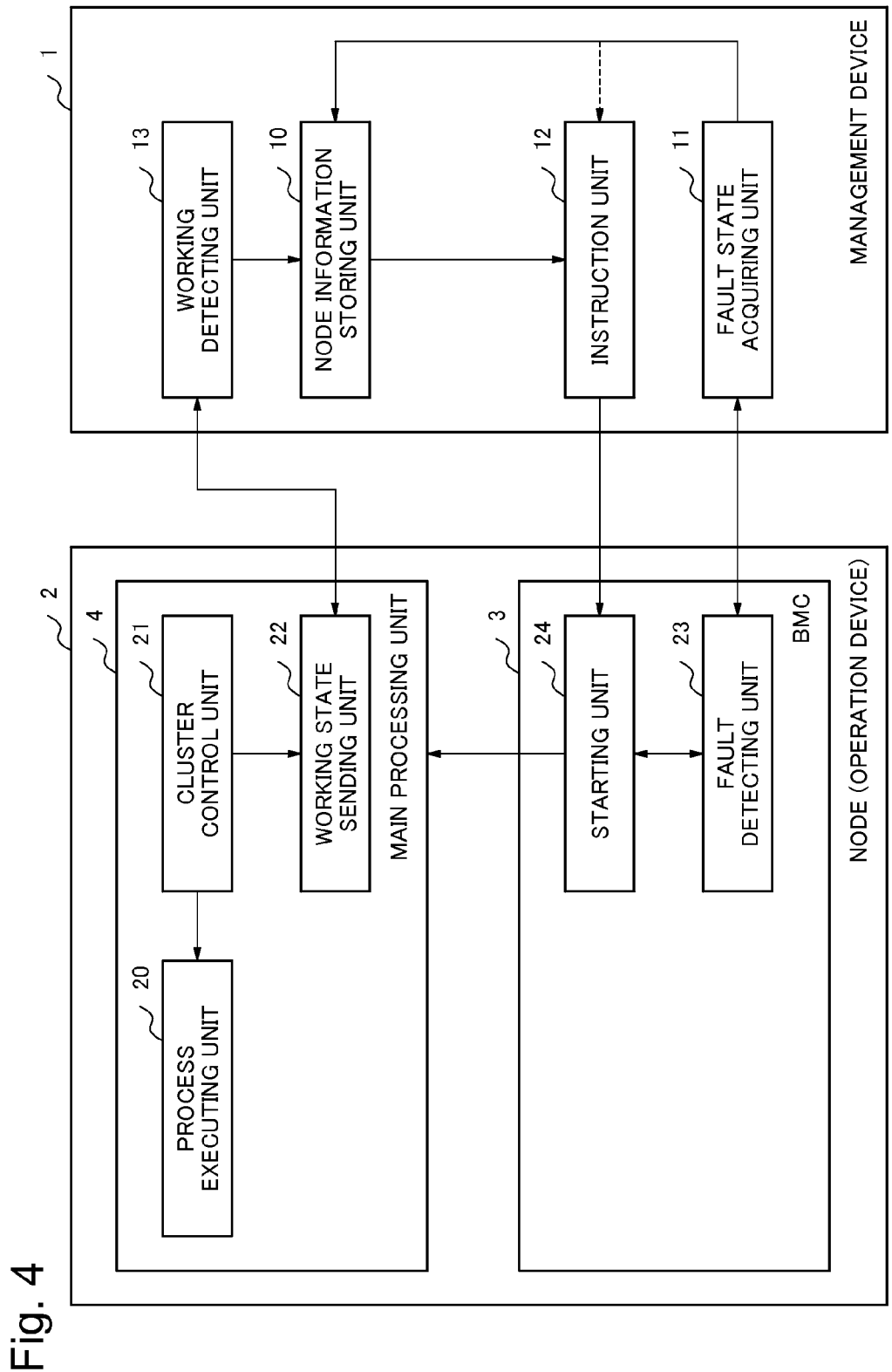
FIG. 4 is a diagram illustrating an example of a relation between a management device 1 and another node 2.

FIG. 4 is a diagram showing a relation between the management device 1 and another node 2. The node 2 shown in FIG. 4 is different from the node 2 that includes the management device 1 shown in FIG. 4.

Next, an operation of the management device 1 according to the exemplary embodiment will be described in detail with reference to a drawing.

Figure 5:
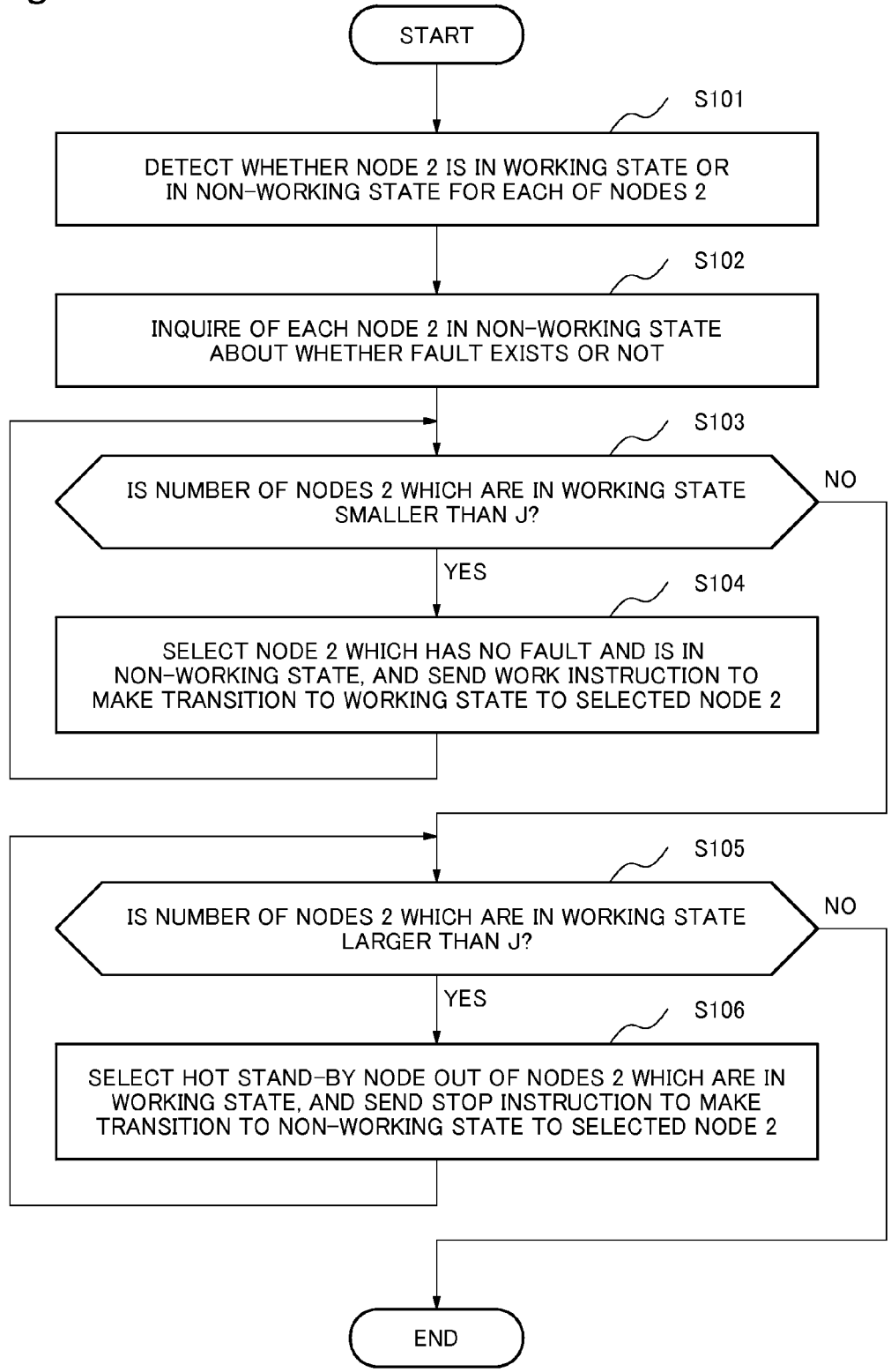
FIG. 5 is a flowchart illustrating an example of an operation of a management device 1 according to the first exemplary embodiment.

FIG. 5 is a flowchart illustrating an example of the operation of the management device 1 according to the exemplary embodiment.

At the beginning of the operation illustrated in FIG. 5, the node information storing unit 10 stores a node list which includes the identifier of each of the nodes 2, a node address of each of the nodes 2, and a BMC address of each of the nodes 2. For example, a manager of the information processing system 100 may store the node list which is in an initial state in the node information storing unit 10 in advance. The node address is an address which is assigned to each of the nodes 2 and which is used when communicating through LAN 6 shown in FIG. 1. The BMC address is an address which is assigned to the BMC 3 of each of the nodes 2 and which is used when communicating through the management LAN 6 shown in FIG. 1.

FIG. 6 is a diagram illustrating an example of the node list which the node information storing unit 10 stores.

The node list shown in FIG. 6 further includes a node state of each of the nodes 2. The node state indicates whether the node 2 is in the working state or in the non-working state.

The node state is detected by the working detecting unit 13. A node list shown in FIG. 6 further includes a BMC state of each of the nodes 2. The BMC state indicates whether or not the fault of hardware including the BMC 3 exists in the node 2. The fault state acquiring unit 11 acquires the BMC state from the BMC 3 of each of the nodes 2 which is in the non-working state. According to the example shown in FIG. 6, in the case that the node 2 is in the working state, the node state is described as "working". In the case that the node 2 is in the working state, the node state may be described as "working state". In the case that the node 2 is in the non-working state, the node state is described as "non-working". In the case that the node 2 is in the non-working state, the node state may be described as "non-working state". In the case that the BMC 3 detects the fault of the node 2, the BMC state is described as "fault". In the case that the BMC 3 does not detect the fault of the node 2, the BMC state is described as "normal". In the case that the node 2 is in the working state, the BMC state is described as "not monitoring-object". Each of "working" ("working state"), "non-working" ("non-working state"), "fault", "normal", and "not monitoring-object" may be represented by a different number or different data determined in advance.

First, the working detecting unit 13 detects whether the node 2 is in the working state or in the non-working state for each of the nodes 2(Step S101).

By acquiring the state of the node 2 from the working state sending unit 22 of each of the nodes 2 which is in the working state, the working detecting unit 13 may detect whether each of the nodes 2 is in the working state or in the non-working state.

Figure 7:
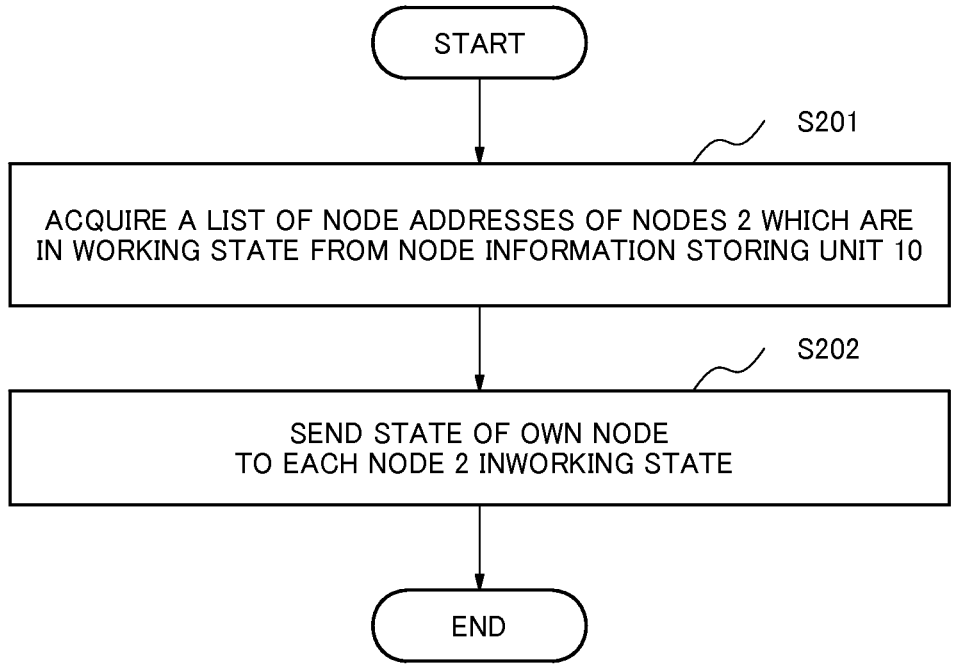
FIG. 7 is a flowchart illustrating an example of an operation of a working state sending unit 22 when sending a state of the node 2.

FIG. 7 is a flowchart illustrating an example of an operation of the working state sending unit 22 when sending the state of the node 2.

First, the working state sending unit 22 of each of the nodes 2 which is in the working state acquires a list of the node addresses of the nodes 2 in the working state from the node information storing unit 10 of the management device 1 included, for example, in the node 2 which includes the working state sending unit 22 (Step S201). The working state sending unit 22 may acquire the list of the node addresses of the nodes 2 in the working state from the cluster control unit 21. In this case, the cluster control unit 21 holds the node address of each of the nodes 2. Furthermore, the cluster control unit 21 detects and holds the state of each of the nodes 2.

To the working detecting unit 13 of the management device 1 in each of the node 2 in the working state, the working state sending unit 22 of the node 2 in the working state sends a value, that is, a state, indicating that the node 2 including the working state sending unit 22, which is described as a own node, is in the working state (Step S202). To the working detecting unit 13 of the management device 1, the working state sending unit 22 may further send information whether the process executing unit 20 of the own device provides the service or not.

Figure 8:
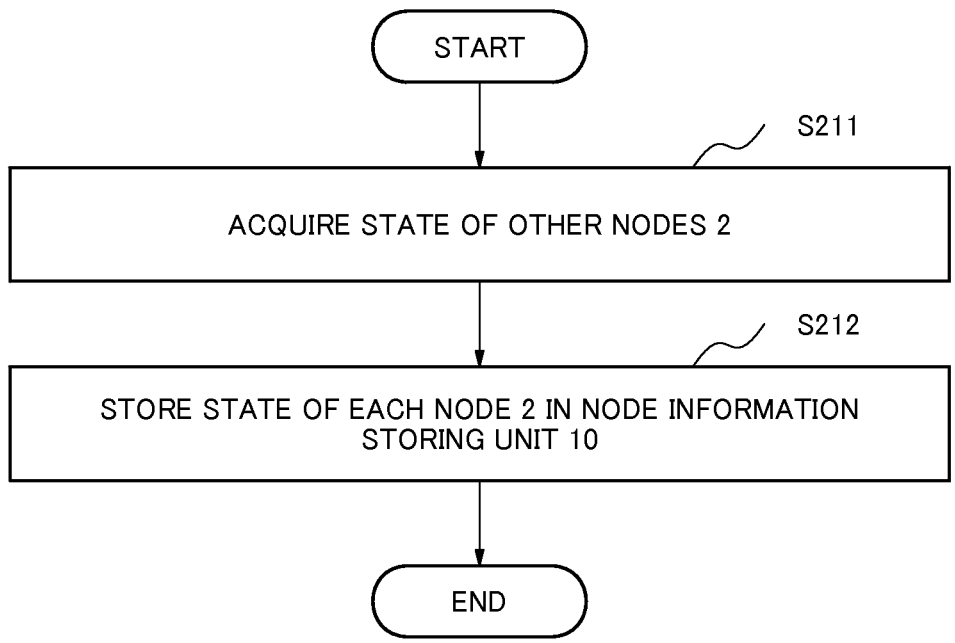
FIG. 8 is a flowchart illustrating an example of an operation of a working detecting unit 13 when receiving the state of each node 2.

FIG. 8 is a flowchart illustrating an example of an operation of the working detecting unit 13 when receiving the states of the nodes 2.

From the working state sending unit 22 of each of the nodes 2 which is in the working state, the working detecting unit 13 receives data which indicates that the node 2 is in the working state (Step S211).

When the working detecting unit 13 receives the data which indicates that the node 2 is in the working state, the working detecting unit 13 updates the node list, which the node information storing unit 10 stores, so that the node 2 is in the working state (Step S212).

The cluster control unit 21 or the working detecting unit 13 may receive, for example, a heartbeat signal from the node 2 which is in the working state, through LAN 5. In the case that the cluster control unit 21 or the working detecting unit 13 receives the heartbeat signal from the node 2, the cluster control unit 21 and the working detecting unit 13 may detect the node 2 as the node 2 in the working state. In the case that the cluster control unit 21 or the working detecting unit 13 does not receive the heartbeat signal from a node 2 among all of the nodes 2, the cluster control unit 21 and the working detecting unit 13 may detect the node 2 from which the heartbeat signal is not received as a node 2 in the non-working state.

Next, the fault state acquiring unit 11 sends the inquiry about whether the fault exists or not to the fault detecting unit 23 of each of the nodes 2 which is in the non-working state (Step S102).

Figure 9:
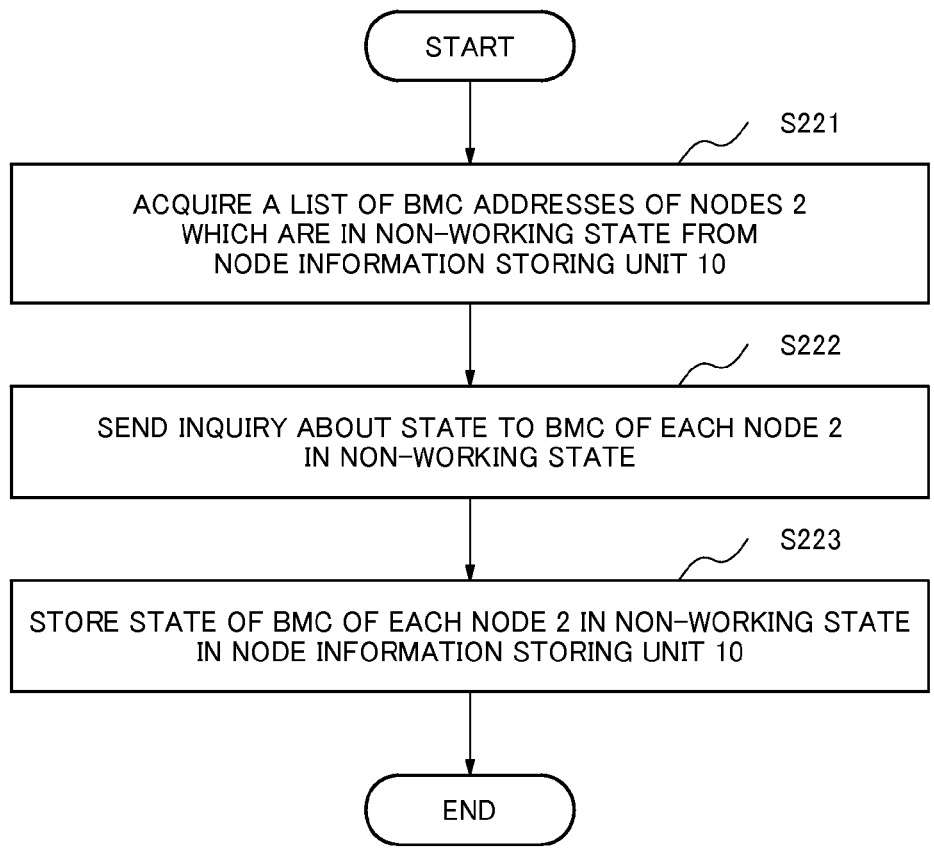
FIG. 9 is a flowchart illustrating an example of an operation of a fault state acquiring unit 11 when receiving a value representing whether or not a fault exists in the node 2 which is in a non-working state.

FIG. 9 is a flowchart illustrating an example of an operation of the fault state acquiring unit 11 when receiving a data indicating whether or not the fault exists in the node 2 which is in the non-working state.

The fault state acquiring unit 11 acquires the BMC address of the node 2 which is in the non-working state from the node state storing unit 10 (Step S221).

Next, to the BMC 3 of each of the nodes 2 which is in the non-working state, the fault state acquiring unit 11 sends the inquiry about whether or not the fault exists in the node 2 (Step S222).

From the fault detecting unit 23 of the BMC 3 of each of the node 2 which is in the non-working state, the fault state acquiring unit 11 receives the data indicating whether the fault exists in the node 2. In the case that the fault state acquiring unit 11 does not receive the data indicating whether or not the fault exists in the node 2 from a node 2 which is in the non-working state, the fault state acquiring unit 11 may estimate that the node 2 from which the data is not received as the node 2 in the fault state.

The fault state acquiring unit 11 updates the BMC state in the node list, which the node information storing unit 10 stores, on the basis of, for example, the data received from the node 2 which is in the non-working state, and the estimated result mentioned above (Step S223).

Figure 10:
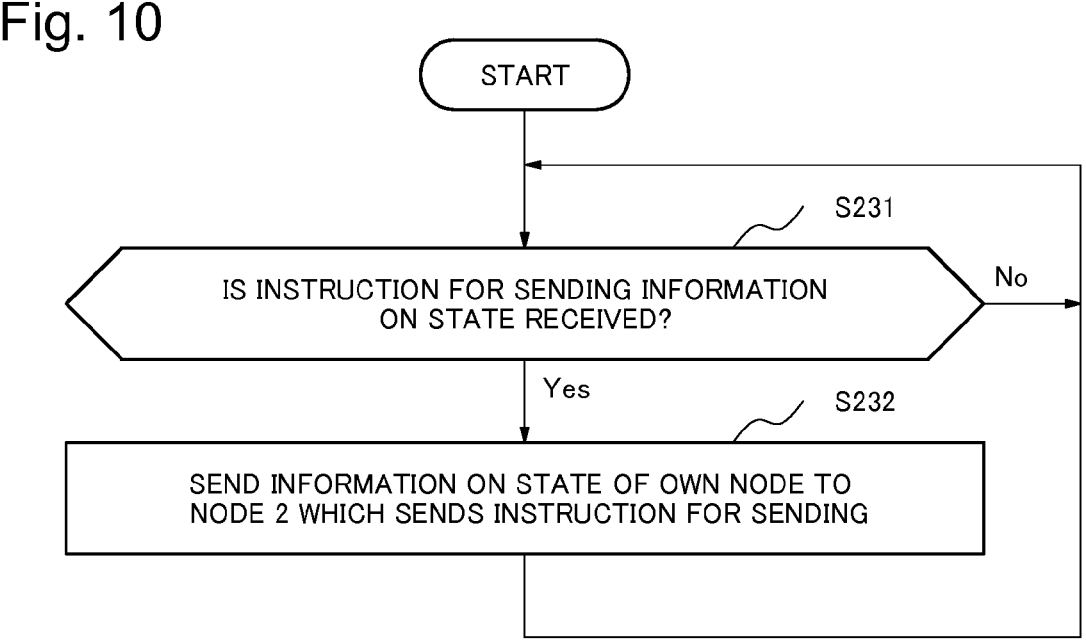
FIG. 10 is a flowchart illustrating an example of an operation of a fault detecting unit 23 when receiving an inquiry about whether or not a fault exists.

FIG. 10 is a flowchart illustrating an example of an operation of the fault detecting unit 23 when receiving the inquiry about whether the fault exists or not.

The fault detecting unit 23 detects whether or not the failure occurs in the hardware of the node 2 including the BMC 3, for example, periodically.

While the fault detecting unit 23 does not receive the inquiry about whether the fault exists or not (No in Step S231), the fault detecting unit 23 stands by. The inquiry about whether the fault exists or not, which the fault detecting unit 23 receives, may be an instruction to send state information.

In the case that the fault detecting unit 23 receives the inquiry about whether the fault exists or not (Yes in Step S231), the fault detecting unit 23 sends the result of detecting whether or not the fault of the hardware to the node 2 which issues the inquiry about whether the fault exists or not (Step S232). In the case that the inquiry about whether the fault is carried out by sending the instruction to send the state information, the node 2 which issues the inquiry about whether the fault exists or not is corresponding to the node 2 which sends the instruction to send the state information.

As a next step in the operation shown in FIG. 5, the instruction unit 12 estimates the number of the nodes 2 which are in the working state.

In the case that the number of the nodes 2 which are in the working state is not smaller than a predetermined number (No in Step S103), the instruction unit 12 carries out a process of Step S105 which will be mentioned later. According to the exemplary embodiment, the predetermined number is j.

In the case that the number of the nodes 2 which are in the working state is smaller than the predetermined number (Yes in Step S103), the instruction unit 12 selects a node 2 which has no fault and is in the non-working state. Then, the instruction unit 12 sends the work instruction to the starting unit 24 of the selected node 2 (Step S104). As mentioned above, the work instruction is the instruction to make the transition to the working state. For example, the instruction unit 12 may count the number of the nodes whose node state is 'working' with reference to the node list which the node information storing unit 10 stores. That is, the instruction unit 12 may count the number of the nodes each of whose identifiers is associated with data representing the working state. Then, instruction unit 12 may compare the counted number and the predetermined number. In the case that the counted number is smaller than the predetermined number, the instruction unit 12 selects a node whose BMC state is 'normal', and whose node state is 'non-working'. The work instruction may be a predetermined signal.

The starting unit 24, when receiving the work instruction, starts up the main processing unit 4. By the main processing unit 4 starting to work, the node 2 which the instruction unit 12 selects makes the transition from the non-working state to the working state.

The instruction unit 12 updates the node list which the node information storing unit 10 stores. That is, the instruction unit 12 changes the node state of the node 2 which makes the transition to the working state to 'working' in the node list.

The instruction unit 12 repeats the process of Step S104 until the number of the nodes 2 in the working state reaches the predetermined number.

In the case that the number of the nodes 2 in the working state reaches the predetermined number (No in Step S105), the management device 1 ends the operation shown in FIG. 5.

In the case that the number of the nodes 2 in the working state is larger than the predetermined number (Yes in Step S105), the instruction unit 12 selects a hot standby node out of the nodes 2 which are in the working state. The instruction unit 12 sends a stop instruction, which is an instruction to make a transition to the non-working state, to the cluster control unit 21 of the selected hot standby node (Step S106).

The cluster control unit 21 of the hot standby node, when receiving the stop instruction, stops the main processing unit 4 of the hot standby node processing. As a result, the hot standby node which receives the stop instruction makes the transition from the working state to the non-working state.

The instruction unit 12 repeats the process of Step S106 until the number of the nodes 2 in the working state reaches the predetermined number.

Next, an operation of the BMC 3 will be described in detail with reference to a drawing.

Figure 11:
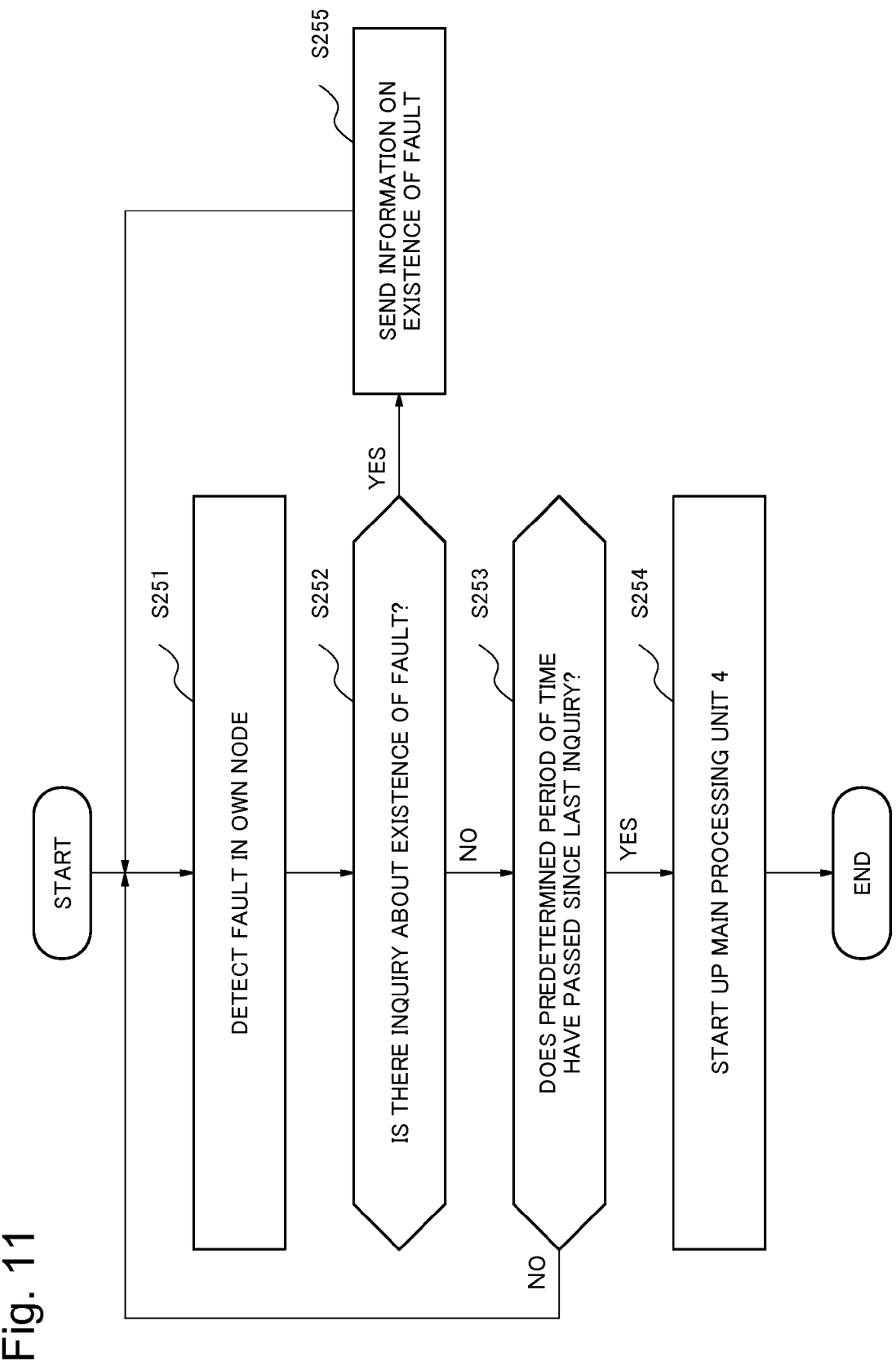
FIG. 11 is a flowchart illustrating an example of an operation of the BMC 3 included in the node 2 which is in the non-working state.

FIG. 11 is a flowchart showing the operation of the BMC 3 of the node 2 which is in the non-working state.

The fault detecting unit 23 of the BMC 3 detects the fault in the node 2 which includes the BMC 3 (Step S251).

Moreover, by use of, for example, a timer, the fault detecting unit 23 counts elapsed time from when the fault detecting unit 23 received the inquiry about whether the fault exists or not from the fault state acquiring unit 11 of the management device 1 last.

In the case that the fault detecting unit 23 receives the inquiry about whether the fault exists or not from the fault state acquiring unit 11 of the management device 1 (Yes in Step S252), the fault detecting unit 23 sends the data indicating whether the fault exists or not to the fault state acquiring unit 11 (Step S255). Then, the fault detection unit 23 resets the elapsed time from when the fault detecting unit 23 received the inquiry about whether the fault exists or not from the fault state acquiring unit 11 of the management device 1 last so as to make the elapsed time zero.

In the case that the fault detecting unit 23 does not receive the inquiry about whether the fault exists or not from the fault state acquiring unit 11 of the management device 1 (No in Step S252), the operation returns to Step S251. Then, the fault detecting unit 23 continues to detect the fault in the node 2 which includes the fault detecting unit 23, and to count the elapsed time from when the fault detecting unit 23 received the inquiry about whether the fault exists or not from the fault state acquiring unit 11 of the management device 1 last.

In the case that a predetermined time has passed since the fault detecting unit 23 received the inquiry on the existence of the fault lastly from the fault state acquiring unit 11 of the management device 1 last (Yes in Step S253), the starting unit 24 starts up the main processing unit 4 of the node 2 which includes the starting unit 24 (Step S254). The starting unit 24 starts up the main processing unit 4, for example, by sending a signal to direct the main processing unit 4 to start up to the main processing unit 4,. The started up main processing unit 4 makes the transition to the starting state. The started up main processing unit 4 may work also as the management device 1. Here, the predetermined time in Step S253 is longer than the time interval at which the inquiry about whether the fault exists or not is periodically issued by the fault state acquiring unit 11 to the fault detecting unit 23 of the BMC 3 of each cold standby node.

The exemplary embodiment mentioned above has a first effect that, when he working operation device which carries out a process fails, that is, a fault occurs in the working operation device, it is possible to change the operation device that carries out a process from the failed working operation device to one of standby operation devices among standby operation devices, even when a standby operation device among the standby operation devices fails, that is, even when a fault occurs in a standby operation device among the standby operation devices. That is, the present invention has an effect that it is possible to reduce a risk that the node 2 in the non-working state, which stands by, fails in making a transition to the working state. The operation device is described as the node 2 in the exemplary embodiment.

The reason is that, when a fault occurs in the node 2 which is in the working state, the instruction unit 12 starts up the node 2, which is selected out of the nodes 2 which have no fault and are in the non-working state, thereby the node 2 makes the transition to the working state. The fault detecting unit 23 of the BMC 3 of the node 2 which is in the non-working state detects the fault of the node 2. Then, in response to the inquiry about whether the fault exists, which the fault state acquiring unit 11 of the management device 1 sends periodically, the fault detecting unit 23 sends the value indicating the result of detection of the fault. Accordingly, the instruction unit 12 can select the node 2 which makes the transition to the working state out of the nodes 2 which have no fault and are in the non-working state.

Moreover, the exemplary embodiment has a second effect that, even when communication between the management device 1 and the BMC 3 of the cold standby node is lost, it is possible to reduce a risk that the information processing system 100 stops working due to the fault which occurs in the node 2 in the working state.

The reason is that, in addition to the reason of the first effect, the starting unit 24 starts up the main processing unit 4 of the node 2 which includes the starting unit 24, when the predetermined time has passed since the fault detecting unit 23 receives the inquiry about whether the fault exists or not from the fault state acquiring unit 11 of the management device 1 last. Therefore, number of the nodes 2 in the working state increases when the management device 1 is not able to communicate with the BMC 3 of the cold standby node due to, for example, a fault occurred in a network between the management device 1 and the BMC 3 of the cold standby node. Accordingly, it is possible to reduce a risk that the information processing device 100 stops working due to lack of the nodes 2 in the working state, even when the node 2 in the working state fails, that is, a fault occurs in the node 2 in the working state, while the communication between the management device 1 and the BMC 3 of the cold standby node is lost.

Furthermore, the exemplary embodiment has a third effect that, when all of the management devices 1 which are working fails, that is, when a fault occurs in each of the management devices 1 which are working, it is also possible for the information processing device 100 to continue working.

The reason is, similarly to the reason of the second effect, that the starting unit 24 starts up the main processing unit 4 of the node 2 which includes the starting unit 24, when the predetermined time has passed since the fault detecting unit 23 receives the inquiry about whether the fault exists or not from the fault state acquiring unit 11 of the management device 1 last. The main processing unit 4 of the node 2 which makes the transition to the working state works also as the management device 1. Even when all the management devices 1 which were working fail, the management device 1 in the node 2 which makes the transition to working state newly starts working.

(Modification of the First Exemplary Embodiment)

Next, an information processing system 100 according to a modification of the first exemplary embodiment will be described in detail with reference to a drawing.

Figure 12:
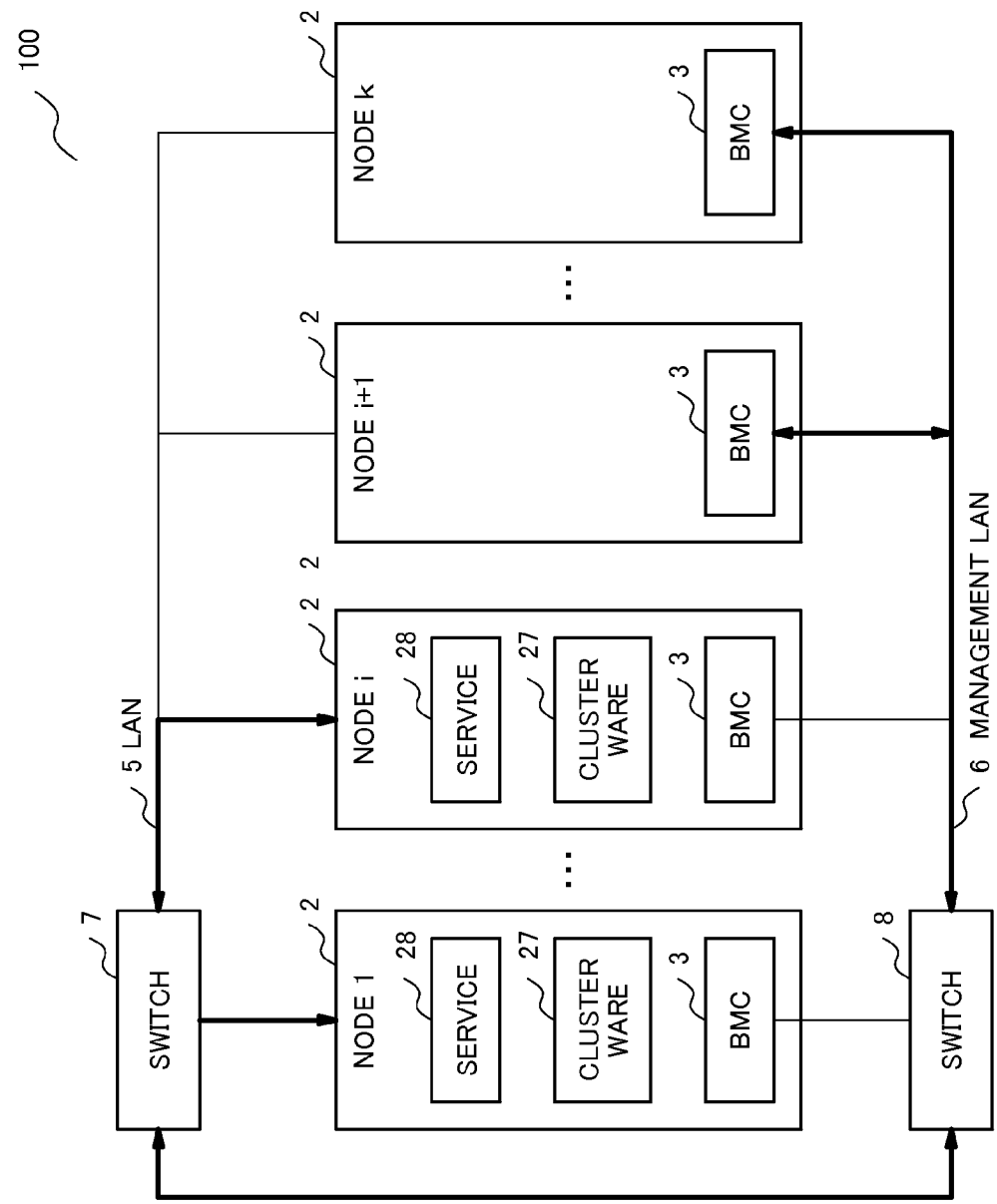
FIG. 12 is a diagram illustrating an example of a configuration of the information processing system 100 according to a modification of the first exemplary embodiment.

FIG. 12 is a diagram showing a configuration of the information processing system 100 according to the modification.

In the configuration of the modification in FIG. 12, the nodes 2 include only the active node and the cold standby node and do not include the hot standby node.

The information processing system 100 according to the modification may have a configuration which does not include the hot standby node. And each of the BMCs 3 may have a configuration so as to carry out an operation mentioned in the following when the node 2 including the BMC 3 is a cold standby node. When time T-BT has passed since the fault detecting unit 23 receives the inquiry about whether the fault exists or not from the fault state acquiring unit 11 of the management device 1 last, the starting unit 24 starts up the main processing unit 4.

Here, T mentioned above is a period of time for the first exemplary embodiment since the fault detecting unit 23 receives the inquiry about whether the fault exists or not from the fault state acquiring unit 11 of the management device 1 last until the starting unit 24 starts up the main processing unit 4. And BT is a period of time since the starting unit 24 starts up the main processing unit 4 until the main processing unit 4 starts to work. According to the modification, BT-T is longer than a time interval of issuing the inquiry about whether the fault exists or not periodically to the fault detecting unit 23 of the BMC 3 of each of the cold standby nodes, which the fault state acquiring unit 11 carries out.

Or, the management device 1 according to the modification may count number of the active nodes, number of the hot standby nodes and number of the cold standby nodes. Then, to the BMC 3 of each of the cold standby nodes, the management device 1 may present the period of time from when receiving the inquiry on the existence of the fault lastly from the fault state acquiring unit 11 until the starting unit 24 starts up the main processing unit 4. When the number of the hot standby nodes is not smaller than one, the period of time which the management device 1 presents to the BMC 3 of each of the cold standby nodes is T. When the number of the hot standby nodes is zero, the period of time which the management device 1 presents to the BMC 3 of each of the cold standby nodes is T-BT.

When the time presented by the management device 1 has passed since the fault detecting unit 23 receives the inquiry about whether the fault exists or not from the fault state acquiring unit 11 of the management device 1 last, the starting unit 24 according to the modification starts up the main processing unit 4.

The operation of each of the management device 1, the node 2, the BMC 3 and the main processing unit 4 according to the modification are the same as the operation of the corresponding element according to the first exemplary embodiment except for the above mention.

Figure 13:
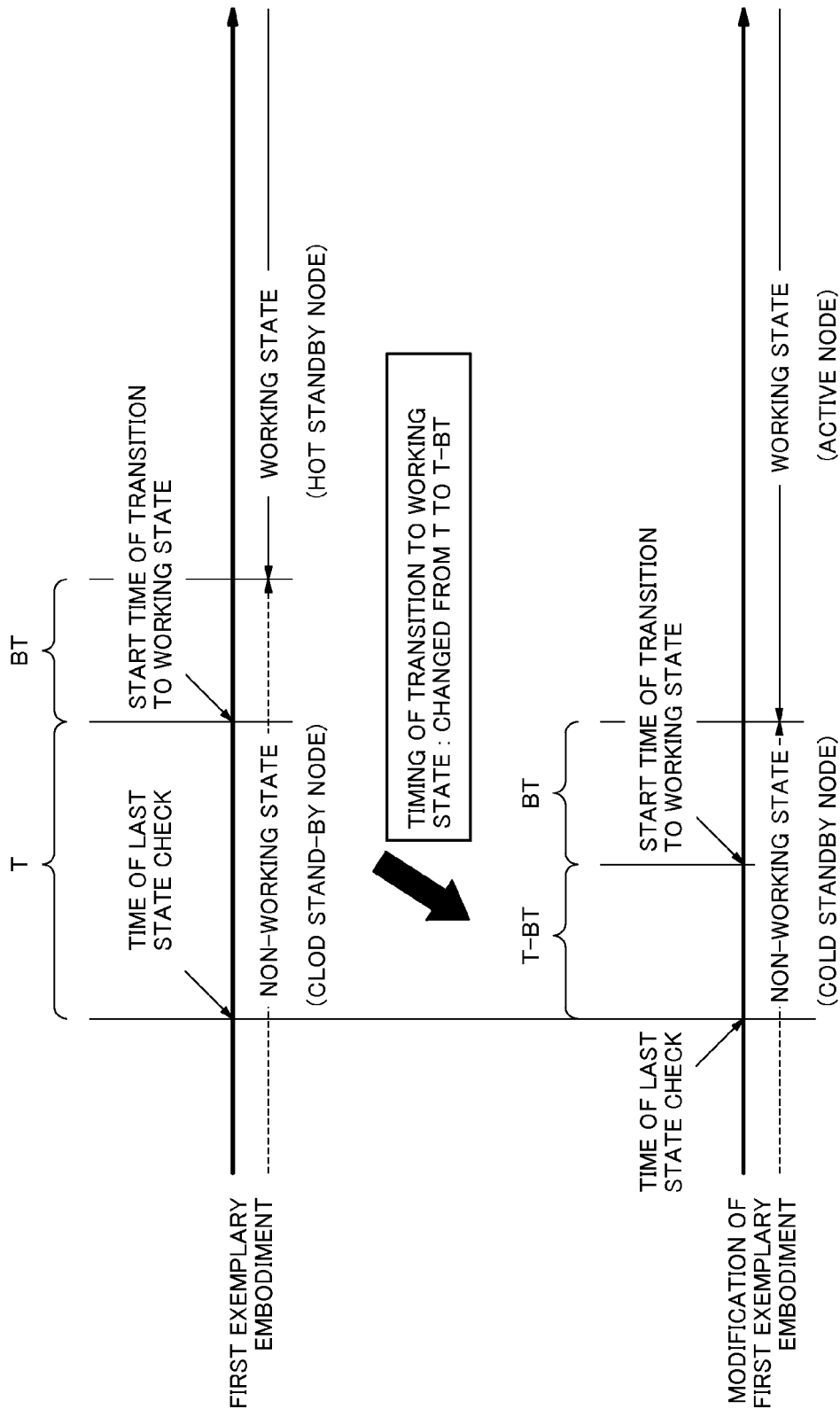
FIG. 13 is a diagram illustrating an example of a time from a last state check by the fault state acquiring unit 11 to starting of a main processing unit 4 by an starting unit 24 according to the first exemplary embodiment and the modification of the first exemplary embodiment.

FIG. 13 is a diagram showing timing from the last state check by the fault state acquiring unit 11 until the starting up of the main processing unit 4 by the starting unit 24. The state check in FIG. 13 corresponds to the inquiry about whether the fault exists or not issued by the fault state acquiring unit 11. The time of the last state check in FIG. 13 is the time when the fault detecting unit 23 receives the inquiry about whether the fault exists or not from the fault state acquiring unit 11. The start time of transition to the working state is the time when the starting unit 24 starts up the main processing unit 4. According to the first exemplary embodiment, the node 2 makes the transition from the non-working state to the working state when time T+TB has passed since the last state check. That is, according to the first exemplary embodiment, the node 2 makes the transition from the cold standby node to the hot standby node when the time T+TB has passed since the last state check. On the other hand, according to the modification, the node 2 makes the transition from the non-working state to the working state when time T has passed since the last state check. That is, according to the modification, the node 2 makes the transition from the cold standby node to the hot standby node when the time T has passed since the last state check. Here, the node 2 may make a transition from the cold standby node to the hot standby node.

In addition to the same effect as the first exemplary embodiment has, the modification mentioned above has an effect that it is possible to reduce power consumption without the down-time of the information processing system 100 increases.

The reason is that the information processing system 100 does not include the hot standby node, but instead the starting unit 24 starts up the main processing unit 4 when the above-mentioned time T-TB has passed since the last state check.

(Second Modification of the First Exemplary Embodiment)

Figure 3:
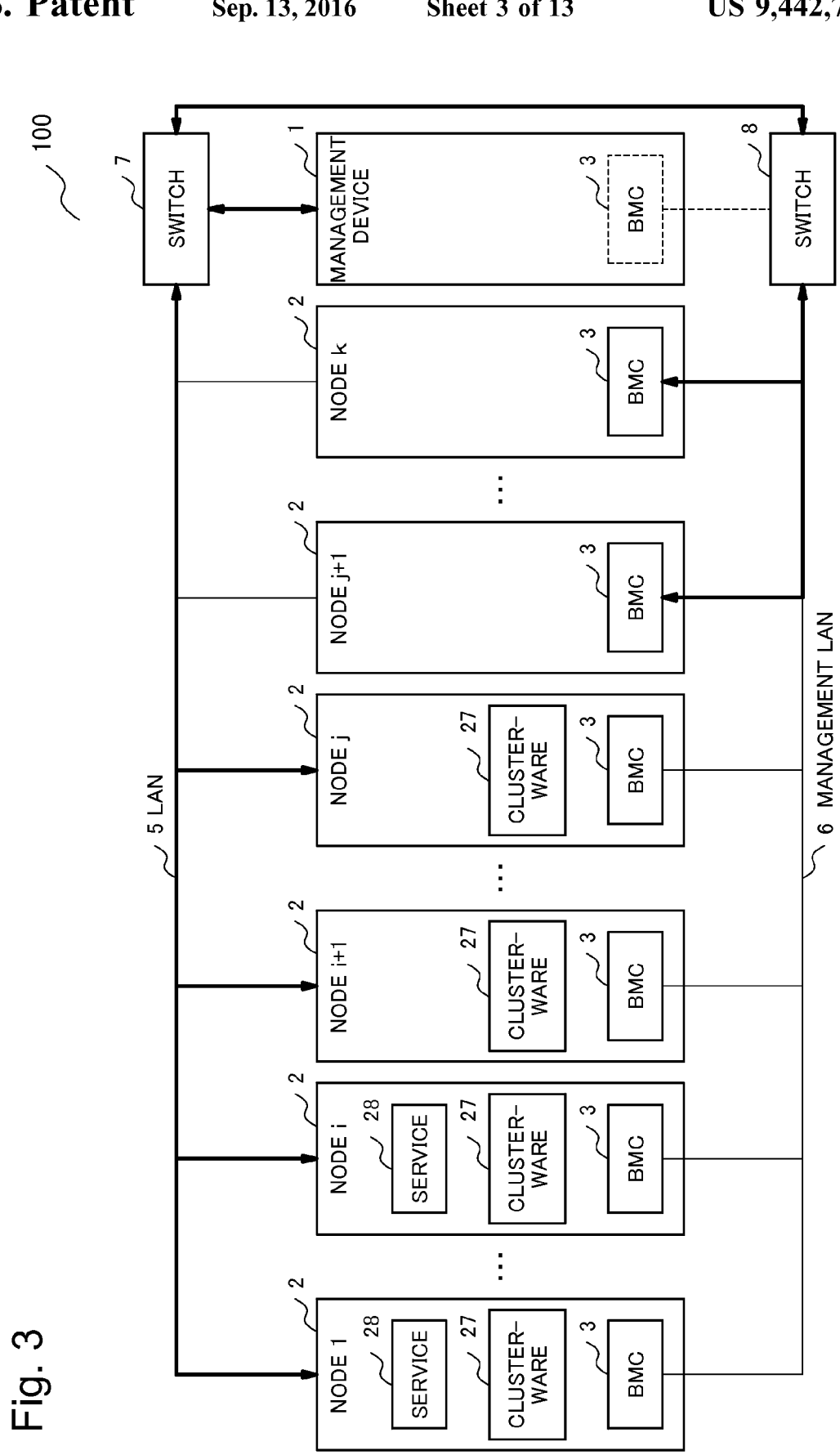
FIG. 3 is a block diagram illustrating an example of a configuration of the information processing system 100 according to a second modification of the first exemplary embodiment.

FIG. 3 is a block diagram illustrating an example of a configuration of the information processing system 100 according to a second modification of the first exemplary embodiment.

The information processing system 100 shown in FIG. 3 includes a plurality of the nodes 2 and the management device 1, which can communicate with each other. As mentioned above, the node 2 is the operation device. According to the example shown in FIG. 3, the information processing system 100 is a cluster system including the nodes 2 whose number is k. According to the example shown in FIG. 3, the information processing system 100 includes one management device 1. However, it may be more preferable that the information processing system 100 includes a plurality of the management devices 1. Each of the nodes 2 may not include the management device 1 as shown in FIG. 3.

The information processing system 100 according to the modification is the same as the information processing system 100 according to the first exemplary embodiment except for a point that the main processing unit 4 does not work as the management device 1.

The modification has effects which are the same as the first and the second effects of the first exemplary embodiment.

The reasons are the same as the reasons of the first and the second effects of the first exemplary embodiment.

(The Configuration Example According to the First Exemplary Embodiment)

Next, a configuration example according to the first exemplary embodiment will be described in detail with reference to a drawing.

FIG. 1 is a diagram showing a configuration of the configuration example. The information processing system 100 shown in FIG. 1 is a cluster in the configuration example.

The cluster includes the nodes 2 whose number is k. The node 2 includes a processor (the processor is not shown in FIG. 1). The processor of the node 2 works as the main processing unit 4 according to the first exemplary embodiment. That is, by carrying out clusterware 27 which is a program, the processor of the node 2 works as the management device 1, the cluster control unit 21, and the working state sending unit 22 according to the first exemplary embodiment. Moreover, the processor of the node 2 executes a program of providing the service 28 as described later. Furthermore, the node 2 includes the baseboard management controller 3 (the BMC 3) which works independently of the above-mentioned processor of the node 2 even if the processor is in a power-off state. The BMC 3 works as the fault detecting unit 23 and the starting unit 24 according to the first exemplary embodiment.

The nodes 2 are connected with each other through LAN 5. The clusterware 27 of the nodes 2 which are in the working state can communicate with each other. BMCs 3 are connected with each other through the management LAN 6. The network switch (switch 7) on LAN 5 and the network switch (switch 7) on the management LAN 6 are connected with each other. Each of the connection on LAN 5, the connection on the management LAN 6, and the connection between the switch 7 and the switch 8 may be a wire connection, a wireless connection, or a combination of the wire connection and the wireless connection, respectively. The clusterware 27 of the node 2 in the working state communicates with the BMC 3 of the node 2 in the non-working state through LAN 5, the connection between switch 7 and the switch 8, and the management LAN 6

The nodes 2 which are the active nodes execute the program of providing the service 28 by use of the processor, and consequently the nodes 2 provide the services 28, for example, for a terminal connected with LAN 5. The clusterware 27 carries out the system changeover in which the node 2 which is one of the hot standby nodes takes over the act of providing the service 28 from the node 2 which is the active node. For example, the clusterware 27 of one of the hot standby nodes carries out the system changeover by controlling the main processing unit 4 so as to start, that is, to activate the program of providing the service 28.

Each clusterware 27 periodically sends the inquiry about whether the fault exists or not to the BMC 3 of each of the cold standby nodes as communication for the state check. When receiving the inquiry about whether the fault exists or not, the BMC 3 sends information on the existence of the detected fault in response to the inquiry. Moreover, in the case that there is no communication for the state check mentioned above for a predetermined period of time, the BMC 3 turn on power supplied to the processor of the node 2 including the BMC 3 so that the node 2 makes the transition to the working state.

Next, a configuration of the node 2 will be described in detail with reference to FIG. 2.

The node 2 includes a processor and a BMC 3. The processor corresponds to the main processing unit 4 in FIG. 2. The processor executes the program of providing the service 28, and executes the clusterware 27. The acts of starting up and stopping the program of providing the service 28 are controlled by the clusterware 27. The BMC 3 is implemented in hardware of the node 2 independent of the processor. The BMC 3 works independently of OS which the processor executes. Even if the processor stops working and consequently the node 2 enters into the non-working state, the BMC 3 continues working.

The program of providing the service 28 makes the processor operate as the process executing unit 20. The clusterware 27 makes the processor operate as the management device 1, the cluster control unit 21, and the working state sending unit 22. The management device 1 includes the node information storing unit 10, the fault state acquiring unit 11, the instruction unit 12, and the working detecting unit 13. The node information storing unit 10 stores the node list. The node list includes a node address, a node state, a BMC address, and a BMC state of each of the nodes 2 which the information processing system 100 includes.

The BMC 3 includes the fault detecting unit 23 and the starting unit 24.

Each of the nodes 2 operates as described in the following.

In the node 2 which is in the working state, the clusterware 27 is operating. The cluster control unit 21 controls the act of starting up and stopping the program of providing the service 28. The cluster control unit 21 detects the fault of the node 2 including the processor which operates as the cluster control unit 21. When the fault is detected, the cluster control unit 21 reads the node list which the node information storing unit 10 stores. Then, the cluster control unit 21 selects one of the nodes 2 which are in the working state and which are other than the node 2 in which the fault is detected on the basis of the read node list. The node management unit 21 sends a request of the system changeover to the cluster control unit 21 included in the selected node 2. The cluster control unit 21 which sent the request and the cluster control unit 21 which received the request carry out operation of system changeover in which the selected node 2 takes over the act of providing the service 28 from the node 2 in which the fault is detected.

The working state sending unit 22 reads the node list which the node information storing unit 10 stores. The working state sending unit 22 specifies each of the nodes 2 in the working state on the basis of the read node list. Then, to the working detecting unit 13 of each of the specified nodes 2 in the working state, the working state sending unit 22 sends the state of the node 2 including the working state sending unit 22 which sends the state. The processor of the node 2 operates as the working state sending unit 22 which sends the state of the node 2. When the node 2 including the working state sending unit 22 operates normally, the working state sending unit 22 may send, for example, data indicating that the node 2 is in the working state as the state of the node 2. The working state sending unit 22 may send data indicating that the node 2 is working as the active node, data indicating that the node 2 is working as the hot standby node, or the like on the basis of the state of the node 2 which includes the working state sending unit 22. When the cluster control unit 21 or the like detects the fault in the node 2, the working state sending unit 22 included in the node 2 may send, as the state of the node 2, for example, data indicating that the node 2 is in the fault state or data indicating that the node 2 is in the non-working state. When the working state sending unit 22 is not able to operate due to the fault, the working state sending unit 22 sends nothing. The working state sending unit 22 sends the state of the node 2 including the working state sending unit 22 to the working detecting unit 13, for example, periodically at a predetermined time interval. The working state sending unit 22 may send the state of the node 2 including the working state sending unit 22, for example, in response to a request from the working detecting unit 13. In this case, for example, to all nodes 2 through LAN 5, the working detecting unit 13 sends the request for sending the state.

The working detecting unit 13 receives the state of the node 2 from the working state sending unit 22 included in the node 2, which is other than the node 2 including the working detecting unit 13. When the working state sending unit 22 does not send the state, the working detecting unit 13 may estimate that the node 2 including the working state sending unit 22 which does not send the state is in the non-working state. The working detecting unit 13 stores the received state of the node 2 in the node information storing unit 10, the received state of the node 2 associated with an identifier of the node 2 which sends the received state, that is, a sending source node.

The fault state acquiring unit 11 reads the node list from the node information storing unit 10. The fault state acquiring unit 11 selects each of the nodes 2 in the non-working state on the basis of the read node list. To the fault detecting unit 23 of the BMC 3 included in each of the selected nodes 2 in the non-working state, the fault state acquiring unit 11 sends an inquiry about a state of hardware of the node 2 including the BMC 3. The state of the hardware indicates whether or not the fault in the node 2 exists, which the fault detecting unit 23 detects. In response to the inquiry about whether the fault or not, the fault detecting unit 23 sends a value or the like indicating whether the fault exists or not. The fault state acquiring unit 11 stores the value indicating whether or not the fault in the node 2 exists, which is received from the fault detecting unit 23 of the node 2, as the BMC state in the node state storing unit 10, the BMC state associated with the identifier of the node 2.

The instruction unit 12 compares number of the nodes 2 in the working state and, for example, a predetermined number. When the number of the nodes 2 in the working state is smaller than the predetermined number, the instruction unit 12 selects a node 2 in which the fault is not detected out of the nodes 2 in the non-working state. To the starting unit 24 of the BMC 3 of the selected node 2 which is in the non-working state, the instruction unit 12 sends an instruction to make a transition from the non-working state to the working state. When receiving the instruction, the starting unit 24 starts up the node 2 including the starting unit 24. That is, the starting unit 24 starts up the processor of the node 2 which includes the starting unit 24. The started processor executes, for example, an OS and then the clusterware 27.

When the number of the nodes 2 which are in the working state is larger than the predetermined number, the instruction unit 12 selects a hot standby node out of the nodes 2 which are in the working state. To the cluster control unit 21 of the selected hot standby node, the instruction unit 12 sends an instruction to make a transition to the cold standby node. When receiving the instruction to make the transition to the cold standby node, the cluster control unit 21 stops the processor of the node 2 including the cluster control unit 21 operating. Specifically, the cluster control unit 21 may shut down the clusterware 27 and the OS which the processor of the node 2 including the cluster control unit 21 executes.

Moreover, the starting unit 24 controls the node 2 so as to make a transition from the non-working state to the working state when the node 2 including the starting unit 24 is in the non-working state, and the fault detecting unit 23 which the node 2 includes does not receive the inquiry about whether or not the fault exists or not from the fault state acquiring unit 11 for a period of time longer than a predetermined period of time. That is, the starting unit 24 starts up the processor including the starting unit 24. The activated processor executes the clusterware 27. Then, the state of the node 2 in operation changes to the working state.

Next, a second exemplary embodiment of the present invention will be described in detail with reference to a drawing.

Figure 14:
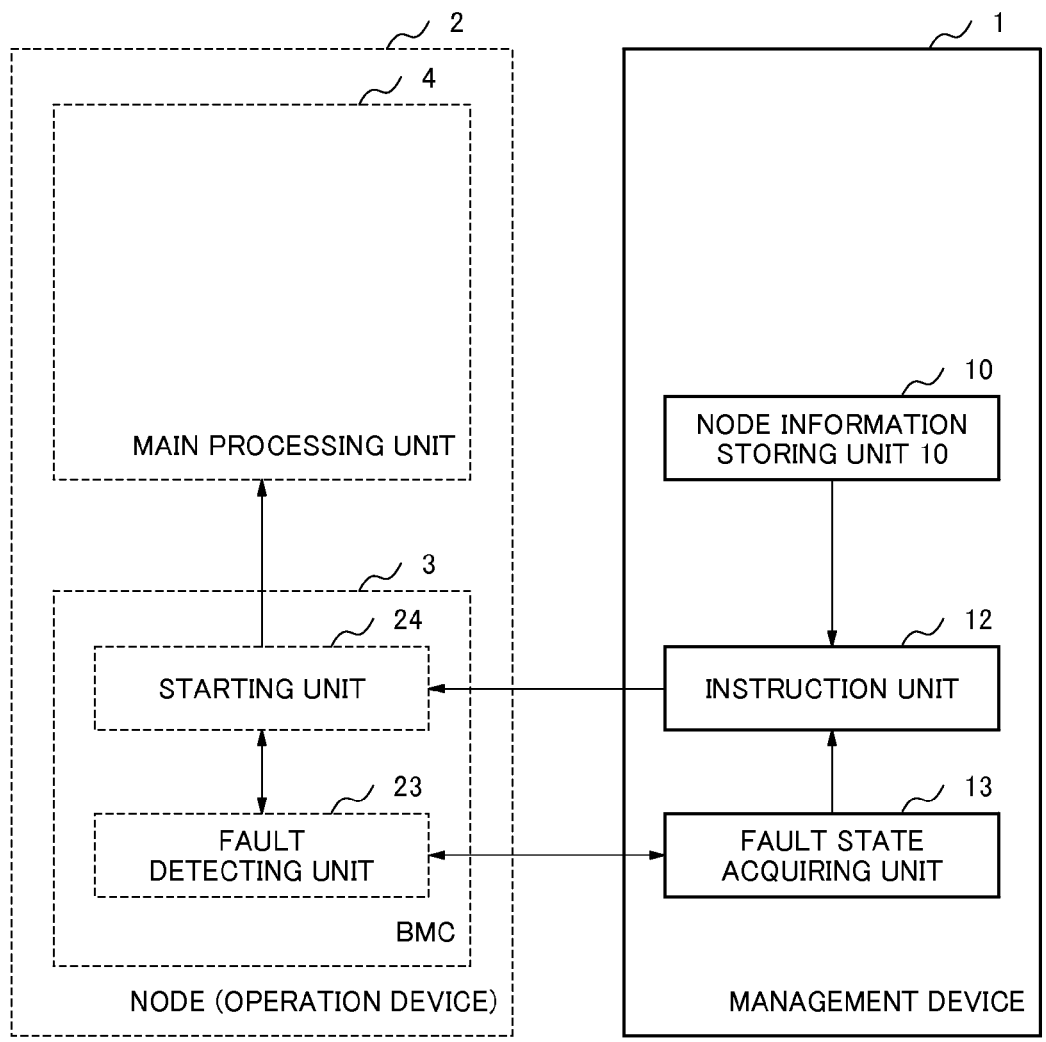
FIG. 14 is a block diagram illustrating an example of a configuration of the management device 1 according to a second exemplary embodiment.

FIG. 14 is a block diagram showing a configuration of the management device 1 according to the exemplary embodiment.

Referring to FIG. 14, the management device 1 according to the exemplary embodiment includes a node information storing unit 10 which stores, for each of plural operation devices 2, an device state representing whether the operation device 2 is in a working state in which the operation device 2 is working or in a non-working state in which the operation device 2 is not working, the device state associated with an identifier of the operation device 2, a fault state acquiring unit 11 which acquires a value representing whether or not a fault exists from each of the operation devices 2 that are in the non-working state, and an instruction unit 12 which sends, when a number of the operation devices 2 is smaller than a predetermined value, a work instruction to the operation device 2 from which the value representing that no fault exists is acquired and which is in the non-working state, among the plural operation devices 2 which make a transition to the working state when receiving the work instruction while in the non-working state.

The exemplary embodiment described above has an effect which is the same as the first effect of the first exemplary embodiment.

The reason is the same as the reason of the first effect according to the first exemplary embodiment.

The management device 1 and the node 2 (operation device 2) can be realized using a computer and a program which controls the computer, dedicated hardware, or a combination of the computer with the program which controls the computer and the dedicated hardware, respectively.

Figure 15:
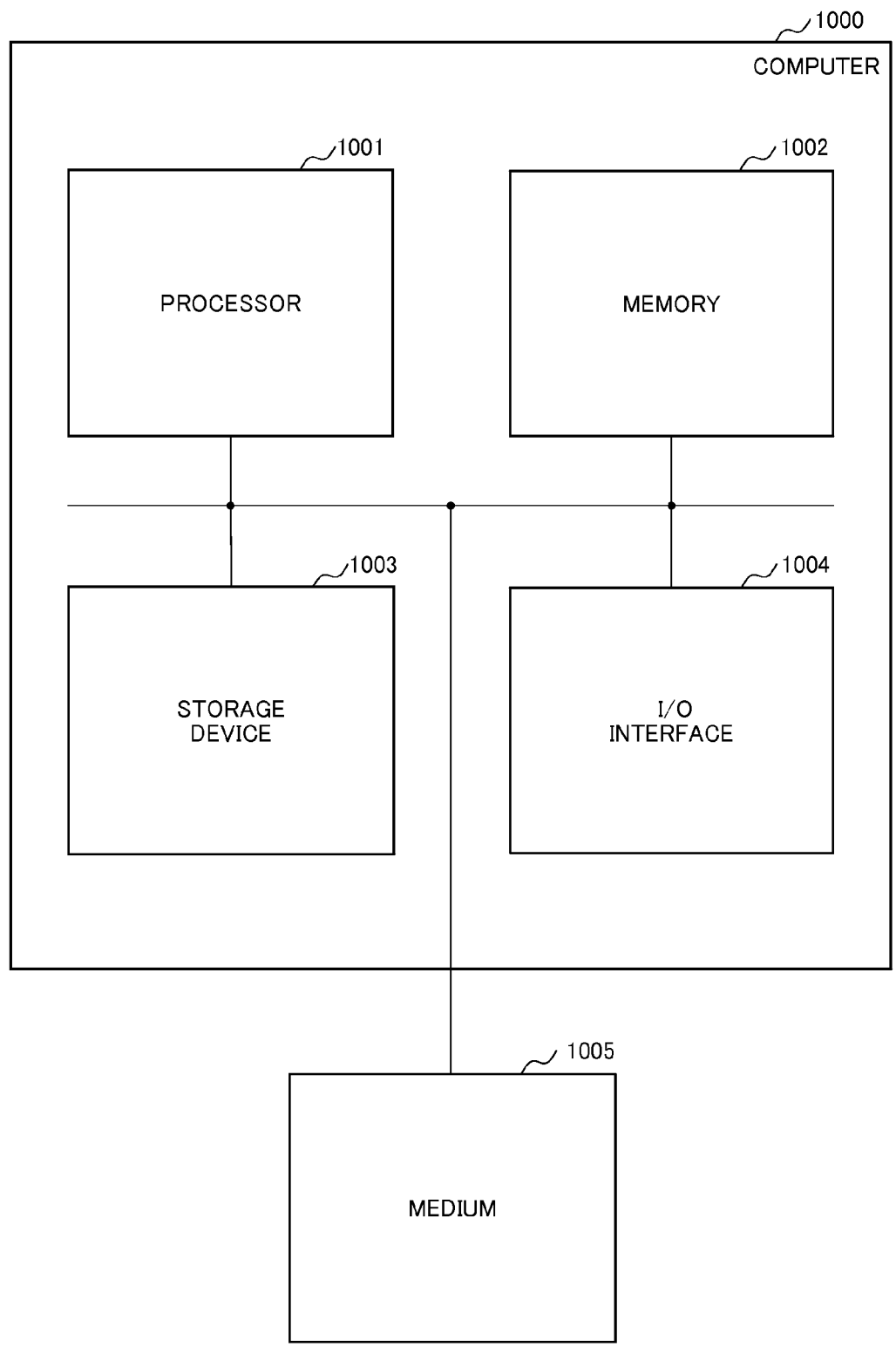
FIG. 15 is a diagram illustrating an example of a configuration of a computer 1000 which is used to implement the management device 1, the node 2, and the BMC 3.

FIG. 15 is a diagram illustrating a configuration of a computer 1000 which is used for realizing the management device 1, the node 2 and the BMC 3.

Referring to FIG. 15, the computer 1000 includes a processor 1001, a memory 1002, a storage device 1003, and an I/O (Input/Output) interface 1004. Moreover, the computer 1000 can access a recording medium 1005. The memory 1002 and the storage device 1003 are realized by a storage device, for example, RAM (Random Access Memory), a hard disk or the like. The recording medium 1005 is, for example, a storage device such as RAM, a hard disk or the like, ROM (Read Only Memory), or a portable recording medium. The storage device 1003 may be used as the recording medium 1005. The processor 1001 may read data and a program from the memory 1002 and the storage device 1003, and may write data and a program to the memory 1002 and the storage device 1003. The processor 1001 may access at least one of, for example, another management device 1, another node 2 and another BMC 3 via the I/O interface 1004. The processor 1001 may access the recording medium 1005. A program which makes the computer 1000 work as the management device 1, the node 2, or the BMC 3 is stored in the recording medium 1005.

The processor 1001 loads the program, which makes the computer 1000 work as the management device 1, the node 2, or the BMC 3, in the memory 1002. By the processor 1001 executing the program which is loaded in the memory 1002, the computer 1000 works as the management device 1, the node 2, or the BMC3.

The fault state acquiring unit 11, the instruction unit 12, the working detecting unit 13, the process executing unit 20, the cluster control unit 21, the working state sending unit 22, the fault detecting unit 23, and the starting unit 24 may be realized by a dedicated program to realize the function of each of the units, which is read from the recording medium 1005 storing the program and is loaded in the memory 1002, and the processor 1001 which executes the dedicated program. Moreover, the node information storing unit 10 may be realized by the memory 1002 which the computer 1000 includes, and the storage device 1003 such as a hard disk device or the like. Or, a part of or a whole of the node information storing unit 10, the fault state acquiring unit 11, the instruction unit 12, the working detecting unit 13, the process executing unit 20, the cluster control unit 21, the working state sending unit 22, the fault detecting unit 23, and the starting unit 24 may be realized by a dedicated circuit which realizes the function of each unit and unit.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty.

Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

According to the related arts described in the patent document 1 and the patent document 2, if the standby operation device fails, when the working operation device, which carries out a process, fails, it is not possible to change normally the device that carries out the process from the failed working operation device to the standby operation device The present invention has an advantage that it is possible to change the operation device that carries out a process from the failed working operation device to one of standby operation devices, even when a standby operation among the standby operation devices may fail.

The invention claimed is:

1. A management device, comprising:
    a node information storing unit which stores, for each of plural operation devices, an device state representing whether an operation device is in a working state in which the operation device is working or in a non-working state in which the operation device is not working, the device state associated with an identifier of the operation device;
    a fault state acquiring unit which acquires a value representing whether or not a fault exists from each of the operation devices that are in the non-working state; and
    an instruction unit which sends, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state, wherein
    the fault state acquiring unit sends an inquiry about whether the fault exists or not to the operation device at a predetermined time intervals to acquire the value representing whether or not the fault of the operation device exists, and
    the operation device in the non-working state makes a transition to the working state when a prefixed time have passed since the last inquiry.

2. The management device according to claim 1, wherein the operation device comprises:
    a main processing unit which carries out a given process;
    a fault detecting unit which detects the fault in the operation device while the operation device is in the non-working state in which the main processing unit is not working; and
    an starting unit which starts up, when receiving the work instruction while in the non-working state, the main processing unit so that the main processing unit starts to work, thereby the operation device makes the transition to the working state in which the main processing unit is working.

3. The management device according to claim 1, comprising:
    a working detecting unit which obtains the device state, for each of the operating devices, by detecting the operation device working or not working, and stores the obtained device state in the node information storing unit, the obtained device state associated with an identifier of the operation device.

4. An information processing system including the management device according to claim 1, comprising:
the plural operation devices which can communicate each other.

5. A management method, comprising:
storing, in a node information storing unit, for each of plural operation devices, an device state representing whether the operation device is in a working state in which an operation device is working or in a non-working state in which the operation device is not working, the device state associated with an identifier of the operation device;
acquiring a value representing whether or not a fault exists from each of the operation devices that are in the non-working state; and
sending, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state, wherein
acquiring the value comprises sending an inquiry about whether the fault exists or not to the operation device at a predetermined time intervals to acquire the value representing whether or not the fault of the operation device exists, and
the operation device in the non-working state makes a transition to the working state when a prefixed time have passed since the last inquiry.

6. A non-transitory computer-readable medium storing a management program which makes a computer work as:
a node information storing unit which stores, for each of plural operation devices, an device state representing whether an operation device is in a working state in which the operation device is working or in a non-working state in which the operation device is not working, the device state associated with an identifier of the operation device;
a fault state acquiring unit which acquires a value representing whether or not a fault exists from each of the operation devices that are in the non-working state; and
an instruction unit which sends, when a number of the operation devices is smaller than a predetermined value, a work instruction to the operation device from which the value representing that no fault exists is acquired and which is in the non-working state, among the plural operation devices which make a transition to the working state when receiving the work instruction while in the non-working state, wherein
the fault state acquiring unit sends an inquiry about whether the fault exists or not to the operation device at a predetermined time intervals to acquire the value representing whether or not the fault of the operation device exists, and
the operation device in the non-working state makes a transition to the working state when a prefixed time have passed since the last inquiry.

7. The non-transitory computer-readable medium according to claim 6, storing the management program, wherein
the operation device comprises:
a main processing unit which carries out a given process;
a fault detecting unit which detects the fault in the operation device while the operation device is in the non-working state in which the main processing unit is not working; and
an starting unit which starts up, when receiving the work instruction while in the non-working state, the main processing unit so that the main processing unit starts to work, thereby the operation device makes the transition to the working state in which the main processing unit is working.

8. The non-transitory computer-readable medium according to claim 6, storing the management program which makes a computer work as:
a working detecting unit which obtains the device state, for each of the operating devices, by detecting the operation device working or not working, and stores the obtained device state in the node information storing unit, the obtained device state associated with an identifier of the operation device.

* * * * *